Jan. 28, 1958  W. WATERMAN  2,821,209
HYDRAULIC FUSES
Filed Jan. 23, 1953
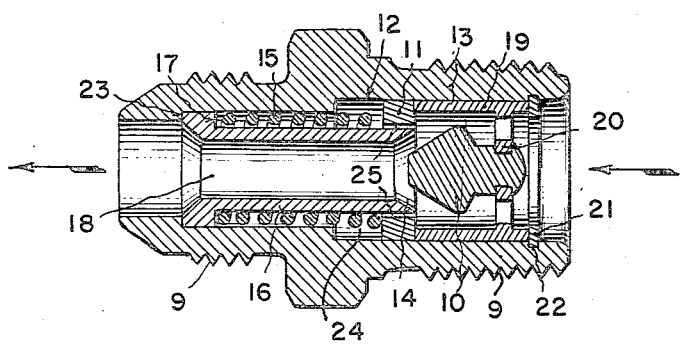
INVENTOR
WILLIAM WATERMAN,
BY *Roland C. Rehm*
ATTORNEY 2,821,209
Patented Jan. 28, 1958

2,821,209

HYDRAULIC FUSES

William Waterman, Wilmette, Ill.

Application January 23, 1953, Serial No. 332,889

2 Claims. (Cl. 137—498)

This invention relates to hydraulic fuses of the excess flow type.

Fuses of this type are designed to close, restrict, or alter flow in a line if the rate of flow exceeds a predetermined maximum, as would be the case if the line were broken. However, momentary excess flow (sufficient to operate the fuse) often occurs without breakage of the line, as where air or some other disturbance causes a momentary surge in the line. The present fuse is designed to be insensitive to such momentary surges, and yet to be responsive to excess flow caused by line breakage or other serious occurrences.

The nature of the invention may be readily understood by reference to one illustrative fuse embodying the invention and shown in the accompanying drawing.

In said drawing, the figure is a longitudinal section through the fuse.

The present invention, an improvement over fuses of the character shown in my prior Patents 2,354,161 and 2,439,118, aims to provide a simplified and low cost fuse for many industrial applications where low cost and simplicity is essential. The fuse is responsive to a flow rate in excess of a predetermined maximum, but is insensitive to surges wherein the rate of flow only momentarily exceeds such maximum. Such surges have various causes, e. g. air in the line, stretching of the fluid line, particularly flexible lines under high pressures, and compressability of the hydraulic fluid. The latter, though generally regarded as incompressible, is actually sufficiently compressible under high pressures to be responsible for momentary surges.

As here shown the valve 10 is normally open and is carried by an annular piston 11 slidable in the cylinder 12 provided by the fuse housing 13. The latter is preferably tubular in form and provided at each end with threads 9 or equivalent means for coupling the fuse in a fluid line. The valve 10 is movable by excess flow in the direction of flow toward seat 14. In the present instance the alteration of flow which occurs upon closing of the valve (as a result of excess flow) is a complete shutting off of flow, but it should be understood that the valve or seat may be designed merely to restrict flow if the maximum flow rate be exceeded. Valve 10 is normally held open by resilient means here represented by spring 15 which is preferably pre-compressed or pre-loaded to prevent closing movement of the valve until the maximum normal or predetermined flow rate is exceeded. The spring is here shown surrounding a replaceable tubular seat member 16 carrying seat 14 and positioned inside the bore in fuse housing 13. The spring is seated between the shoulder 17 on member 16 and piston 11. The enlarged shoulder 17 advantageously has a press fit inside housing 13. The bore through the seat member 16 provides the passage 18 through the fuse, and is made as large as practicable to minimize restriction of flow through the fuse. For the same purpose the tubular piston body 19 is given a maximum internal diameter.

Valve 10 is carried by the piston body, in this instance, on transverse arms 20 (integral with the piston body) which form a perforated spider to which the piston is riveted. The spaces between the arms are made large to present a minimum restriction to flow.

Piston 11 is in the form of an annular ring slidably fitting the annular space between cylinder 12 and the exterior of the tubular seat 16. In the present instance piston 11 is separate from the piston body 19 to permit the replacement of the piston as presently explained.

The fluid pressure drop through the fuse increases with the velocity or rate of flow, and eventually becomes sufficient to move the piston and valve 10 towards its seat against the resistance of spring 15. This will occur when the flow rate exceeds the predetermined maximum for which the fuse is adjusted. As the valve closes throttling of the passage between the valve and seat increases the pressure drop at a substantially greater rate than the resistance of spring 16 under deflection, with the result that once the initial pre-loading of the spring is exceeded, the valve will snap shut and remain shut until the fluid pressure is relieved.

The capacity and adjustment of the fuse may be varied by change in the spring and the bore 18 in seat 16, each of which may be easily removed and replaced by removing the retaining ring 21 seated in an internal groove 22 in the fuse housing. The conformation of valve 10 which determines the resistance it offers to flow past it may be varied by replacement with a differently shaped valve. Spring 15 aids in holding the seat member 16 against shoulder 23 in the fuse housing and piston body 19 against the retaining ring 21.

The annular cylindrical space 24 for piston 11 acts as a brake or dash-pot to retard closing movement of valve 10 until a momentary fluid surge has subsided, at which time the spring returns the valve to fully open position. The fluid confined in space 24 must escape before the valve can close. Such escape takes place mainly through the space 25 between piston 11 and the exterior surface of seat member 16. This space may be varied by adjusting the clearance between piston 11 and member 16, which adjustment may readily be effected by replacement of piston 11 with another having a different clearance with member 16.

It will be apparent from the foregoing that the illustrated fuse may be made at low cost since substantially all parts may be made by automatic screw machines or by other low cost methods.

Obviously the invention is not limited to the details of the illustrative fuse, since these may be variously modified. Moreover it is not indispensible that all features of the invention be used conjointly since various features may be used to advantage in different combinations and subcombinations.

Having described my invention I claim:

1. An excess flow fuse comprising in combination a fuse housing having inlet and outlet and a cylindrical bore connecting the same, said bore having a shoulder adjacent its down-stream end, a removable tubular member slidable in said bore through which flow passes from inlet to outlet and seated at its down-stream end against said shoulder, said tubular member having a valve seat adjacent its up-stream end, said bore having adjacent said seat an enlarged cylindrical chamber coaxial with said bore and outside said tubular member to provide an annular space between its walls and the exterior of said tubular member, an annular piston slidable in said annular space, the latter being closed by said piston except for restricted leakage from one side of said piston to the other, a normally open valve carried by said piston up-stream of said seat in the path of flow and movable thereby at a rate determined by the rate of said restricted leakage toward said seat to cut off flow through said tubular member, and a spring operatively engaging said piston and pre-stressed to resist movement of said piston under the force exerted on said valve by normal flow and yieldable to permit closing of said valve under the force of flow in excess of normal, said housing having a shoulder adjacent its up-stream end for seating said piston under the force of said pre-stressed spring in the normally open position of said valve, said valve being constructed and arranged so that its closing movement increases the pressure drop at said seat at a rate greater than the increase in resistance of said spring as it is deflected by movement of said valve, whereby the closing forces on said valve exceed the resistance of said spring once said valve starts to close.

2. An excess flow fuse comprising in combination a fuse housing having inlet and outlet and a cylindrical bore connecting the same, said bore having a shoulder adjacent its down-stream end, a removable tubular member slidable in said bore through which flow passes from inlet to outlet and seated at its down-stream end against said shoulder, said tubular member having a valve seat adjacent its up-stream end, said bore having adjacent said seat an enlarged cylindrical chamber coaxial with said bore and outside said tubular member to provide an annular space between its walls and the exterior of said tubular member, an annular piston slidable in said annular space, the latter being closed by said piston except for restricted leakage from one side of said piston to the other, a normally open valve carried by said piston up-stream of said seat in the path of flow and movable thereby at a rate determined by the rate of said restricted leakage toward said seat to cut off flow through said tubular member, said tubular member providing a straight and clear passage for unobstructed fluid flow therethrough, said tubular member having an exterior shoulder adjacent its down-stream end, and a spring lying in the space between said tubular member and said chamber bore and bearing at one end against said exterior shoulder and at the other against said piston, said spring being pre-stressed to resist movement of said piston under the force exerted on said valve by normal flow and yieldable to permit closing of said valve under the force of flow in excess of normal, said housing having a shoulder adjacent its up-stream end to seat said piston under the force of said pre-stressed spring, said valve being constructed and arranged so that its closing movement increases the pressure drop at said seat at a rate greater than the increase in resistance of said spring as it is deflected by movement of said valve, whereby the closing forces on said valve substantially exceed the resistance of said spring once said valve starts to close.

References Cited in the file of this patent

UNITED STATES PATENTS

| | | |
|---|---|---|
| 2,318,962 | Parker | May 11, 1943 |
| 2,318,963 | Parker | May 11, 1943 |
| 2,518,988 | Hartley | Aug. 15, 1950 |
| 2,583,295 | Greer | Jan. 22, 1952 |